US012668153B2

(12) United States Patent
De Brouwer et al.

(10) Patent No.:  US 12,668,153 B2
(45) Date of Patent:      Jun. 30, 2026

(54) ADAPTIVE BATTERY CHARGE

(71) Applicant: Airbus Operations S.L.U., Getafe (ES)

(72) Inventors: Gabrielle Josephine Christiane De Brouwer, Getafe (ES); Maria Jose Blanco Martin, Getafe (ES); Erick Gonima, Getafe (ES)

(73) Assignee: Airbus Operations S.L.U., Getafe (ES)

( * ) Notice: Subject to any disclaimer, the term of this patent is extended or adjusted under 35 U.S.C. 154(b) by 189 days.

(21) Appl. No.: 18/517,369

(22) Filed: Nov. 22, 2023

(65) Prior Publication Data

US 2024/0217392 A1      Jul. 4, 2024

(30) Foreign Application Priority Data

Dec. 29, 2022    (EP) ..................................... 22383312

(51) Int. Cl.
B60L 58/20        (2019.01)
B60L 15/20        (2006.01)
B60L 58/12        (2019.01)
*B60L 58/16*        (2019.01)

(52) U.S. Cl.
CPC ........... B60L 58/20 (2019.02); B60L 15/2045 (2013.01); B60L 58/12 (2019.02); *B60L 58/16* (2019.02); *B60L 2200/10* (2013.01)

(58) Field of Classification Search
CPC ........ B60L 3/0046; B60L 58/10; B60L 58/21; B60L 58/16; B60L 58/12; B60L 53/62; B60L 53/00; B60L 53/80; B60L 53/16; B60L 53/66
See application file for complete search history.

(56) References Cited

U.S. PATENT DOCUMENTS

| | | | |
|---|---|---|---|
| 10,589,635 B1 | 3/2020 | Solodovnik et al. | |
| 11,465,529 B1 | 10/2022 | Palombini | |
| 2022/0255335 A1* | 8/2022 | Khozikov | ............ G01R 31/396 |
| 2022/0268842 A1 | 8/2022 | Kurtz et al. | |
| 2022/0399590 A1 | 12/2022 | Lagarde et al. | |

FOREIGN PATENT DOCUMENTS

EP          3703220 A1     9/2020

OTHER PUBLICATIONS

European Search Report for corresponding European Patent Application No. 22383312.0 dated May 24, 2023; priority document.

* cited by examiner

*Primary Examiner* — Bryan R Perez
(74) *Attorney, Agent, or Firm* — Greer, Burns & Crain, Ltd.

(57)                ABSTRACT

A system and a method for controlling the charge of at least one aircraft battery, and more specifically, a system and method for simultaneously controlling the charge of aircraft batteries based at least on information from the at least one parameter of the batteries and information about the mission profile of the aircraft.

17 Claims, 5 Drawing Sheets

7

ADAPTIVE BATTERY CHARGE

CROSS-REFERENCES TO RELATED APPLICATIONS

This application claims the benefit of the European patent application No. 22383312.0 filed on Dec. 29, 2022, the entire disclosures of which are incorporated herein by way of reference.

FIELD OF THE INVENTION

The present invention relates generally to the field of batteries onboard a vehicle, such as an aircraft. Specifically, the present invention relates to a system and a method for controlling the charge of at least one aircraft battery, and more precisely, a system and method for controlling the charge of aircraft batteries based at least on information from at least one parameter of the batteries and information about the mission profile of the aircraft.

BACKGROUND OF THE INVENTION

It should be observed that the charge control system for at least one battery of a vehicle described hereinafter is applied to an aircraft, for example to an electrically-powered aircraft, or hybrid aircraft, but can also be adapted to other types of vehicles.

Increasingly frequently, electrical energy is employed as an energy source for vehicles, mainly for economic and ecological reasons. This energy may be stored in one or more electrical batteries, referred hereinafter as "batteries", installed in appropriate compartments in vehicles. The purpose of these batteries is to supply power to various systems of the vehicle, such as propulsive systems, control-command systems and electrical equipment, for the operation thereof.

All aircraft incorporate an electrical system, and in the vast majority of cases, the primary electrical system incorporates one or more batteries. For example, batteries are used during preflight to power up the electrical system and to start the Auxiliary Power Unit (APU) and/or the engines. Once started, the APU or engine(s) drive generators which then power the electrical circuits and recharge the batteries.

Current batteries used for aircraft, such as Lithium-ion (Li-Ion) batteries and Nickel Cadmium (NiCd) batteries, include a charge limitation device that allows to stop the charge above a certain voltage reached, but does not perform the control of the current during the charge.

SUMMARY OF THE INVENTION

The present invention provides a charge control system, an aircraft, and a method for controlling the charge of at least one battery.

To address the need for aircraft battery charging control, the present invention proposes a charge control system for controlling the charge of aircraft batteries and a method for controlling the charge of aircraft batteries according to the flight phases.

In a first inventive aspect, the present invention provides a charge control system for controlling the charge of at least one battery of an aircraft, the system comprising:

at least one battery control unit configured to monitor at least one parameter of the at least one battery;

a controller in data communication with the at least one battery control unit and configured to receive at least data related to a mission profile of the aircraft;

wherein:

the at least one battery control unit and the controller are configured to be connected to the electric power network of the aircraft;

the at least one battery control unit is further configured to determine a plurality of charge set points based on the at least one parameter of the at least one battery, each charge set point comprising data relative to at least a current target the at least one battery may receive to be charged;

the controller is configured to receive the charge set points and the at least one parameter of the at least one battery from the at least one batter control unit, and to determine, based at least on the charge set points, the at least one parameter of the at least one battery and the data related to the mission profile of the aircraft, whether to charge the at least one battery and according to which charge set point; and the at least one battery control unit is further configured to supply the at least one battery with electric power, that comes from electric power network of the aircraft, according to the charge set point selected by the controller.

The present charge control system is suitable to be installed onboard an aircraft with the aim to control the charge of at least one battery of the aircraft. This system comprises at least one battery control unit and a controller. The charge control system controls the charge of one or more batteries in the sense that it determines whether a battery must be charged or not and how. The term "battery" can also mean multiple cell batteries or battery racks.

The battery control unit is configured to monitor at least one parameter of the battery. The at least one parameter of the battery is representative of a functional and/or physical state of the battery. The at least one parameter of the battery may be selected from: state of charge, state of health, temperature, state of power, imbalance status of battery cells, failure status, voltage, capacity or any combination thereof.

The battery control unit is further configured to determine a plurality of charge set points based on the monitored at least one parameter of the battery. A charge set point is an indication of the maximum current that the battery should be charged and comprises data relative to at least a current target the battery may receive to be charged. The present control charge system is able to determine, from a plurality of different charge set points, the appropriate charge set point for each battery according to at least one parameter of the battery. Each charge set point corresponds to a charging mode, and is understood as at least one parameter that defines how to charge the battery (if needed), and this parameter can be differentiated by levels or ranges so that several charging modes can be considered. Examples of charging modes may be fast charge rate, optimum charge rate and slow charge rate. The optimum charge rate shall be understood as the charge rate to optimize the life of the batteries in each specific situation. Therefore, the battery control unit determines charge set points for charging modes so that each charge set point corresponds to a charging mode.

On the other hand, the controller is in data communication with the at least one battery control unit for receiving the charge set points determined by the battery control unit and data about the at least one parameter of the battery also provided by the battery control unit. In addition, the controller is provided with data related to the mission profile of the aircraft from the aircraft systems. The mission profile of an aircraft defines the phases when different events and environments occur during an aircraft mission. Specifically, the "mission" is an industry-specific term for the details of an aircraft trip such as distance traveled or flight range, operating hours, number of passengers, number of light segments, luggage, cabin size, etc. That is, the mission profile is defined by the flight distance, altitude, passengers, payloads, locations, how the mission varies, flight time, specific weather conditions on the route, and others. A simple mission profile comprises the following stages: taxiing, take-off, climb, cruise, descent, approach, landing and parking.

Based on the data related to the mission profile of the aircraft, the charge set points and the at least one parameter of the battery, the controller is configured to determine whether to charge the battery and according to which charge set point. That is, based on flight, aircraft and battery conditions, the controller decides whether to charge the battery and if so, selects one of the charge set points already determined by the battery control unit, i.e., selects under which charging mode (for example fast, optimum and slow) the battery is to be charged.

Both the battery control unit and the controller are configured to be connected to the electric power network of the aircraft. This connection with the electric power network of the aircraft allows the operation of both the battery control unit and the controller. In addition, the controller is configured to receive information about instantaneous available power on the electric power network of the aircraft. The controller may also consider this information about instantaneous available power in the electric power network in order to determine whether to charge a battery and according to which charge set point.

The controller is configured to instruct the electrical power network of the aircraft to supply electric power to each battery for being charged, so that the battery control unit controls that the electric power is supplied to the battery fulfilling the charge set point already determined. The connection of the controller and the battery control unit with the electric power network also allows the controller to send the order to the bus bar of the electric power network of the aircraft to charge the battery through the battery control unit. Also, through the electric power network, the determined current target (necessary power) to charge the battery is supplied based on the instructions from the controller indicating to the battery control unit the charge set point including the current target at which the battery should be charged. Specifically, when the controller determines the charge set point according to which the battery is to be charged, the controller informs the battery control unit, sending the determined charge set point, in order for the battery control unit to control the charging of the battery ensuring that such charge set point determined by the controller would be fulfilled.

In an embodiment, the battery control unit comprises a converter and a battery monitoring system. The battery monitoring system is responsible for monitoring the battery parameters and for determining the charge set points, while the converter is in charge of converting the electric power coming from the electric power network of the aircraft in adequate electric power to charge the battery. The converter may be of a DC/DC type (e.g., a buck converter) which transforms direct current from one voltage level to another or an AC/DC type which transforms alternating current into direct current. Therefore, the converter controls the charging of the battery usually by converting the electric power coming from the electric power network of the aircraft to be supplied to the battery.

An aircraft is provided with an electrical system that is a self-contained network of components that generate, transmit, distribute, utilize and store electrical energy. Furthermore, electrical power is supplied to the various electrically energized components in an aircraft via common points called bus-bars or buses. The electrical power distribution system is thus based on one or more buses and an electric power network.

The charge set point is configured to be updated at any time as required. For example, in the event of a change in the battery properties, i.e., over/under voltage, over temperature, unexpected battery cell failure, etc., the battery control unit updates the charge set points accordingly and informs the controller. In addition, the controller is further configured to transmit in command mode the decided charge set point to the aircraft electrical system so that it distributes through the electric power network of the aircraft the power to charge the battery according to the charge set point determined.

The present charge control system advantageously allows precise control of charging of a battery in an aircraft in real time. In addition, the configuration of this system allows the management of the battery charging for enhanced operability and optimized lifetime of the battery. Furthermore, this system allows flexibility of installation of a given battery design in different zones with different temperature ranges, only modifying the determination of the type of charge allowed for each specific battery.

The control of the current in existing aircraft batteries is not performed based on factors such as battery operability's needs and the optimization of lifetime according to real time parameters. This may lead to potentially stressing the battery in cold temperature and to reduce its lifetime by charging it at too high current for its temperature, or to charge the battery too slowly in other operational cases when the battery is required for operation. These drawbacks are avoided by the charge control system of the present invention.

In a particular embodiment, the controller is configured to determine whether to charge the at least one battery and according to which charge set point in accordance with a predetermined algorithm which takes into account the data related to the mission profile of the aircraft, the charge set points and the at least one parameter of the at least one battery.

In a particular embodiment, each charge set point corresponds to a given battery charge rate. According to this embodiment, the parameter used to define the charge set point of a battery is the charge rate. In particular, the charge set points comprise a set of different charge rates so that the battery must be charged at pre-set charge rate ranges depending on the needs of the aircraft (at least according to the mission profile) and the at least one parameter of the battery.

In a more particular embodiment, the charge set points correspond to three battery charge rates, namely a fast speed, an optimum speed and a slow speed, and the battery control unit is configured to determine a dynamic charge set point corresponding to each fast, optimum and slow charge rate. These three charge rates are representative of predefined rate ranges. However, the present system is not limited to these three charge rates. In other embodiments, a different number of charge set points may be defined depending on operational scenarios of the aircraft and/or the charge set points may be defined based on a parameter other than the charge rate.

In a particular embodiment, the controller is also configured to receive input data from a crew or a crew member and/or from a computer configured to manage at least part of the aircraft operations. The data from a crew or crew member and/or from a computer are input instructions provided from the aircraft or from ground requesting the use of electric power to perform a particular operation. Examples of the data from the crew or a crew member or from a computer are data regarding a planned APU start sequence, weather related operational decisions, and air traffic management impacts, among others. The data received from the crew, or the computer is further considered by the controller to determine whether to charge the battery and according to which charge set point. Choice of charge set point should be done following the priority level of use of the battery computed depending on the different inputs, including crew request.

According to this embodiment, input data from the piloting crew or from remote control team or computer are also in the decision loop to adapt the charge of the batteries. That is, the operational input is also taken as a parameter for the controller to decide the charge set point for each battery in the aircraft. Advantageously, compared to the prior art, this solution brings the added value on the battery life and does not only focus on the engine profile and optimization of power from an electrical point of view but also enhances the lifetime of the storage compartment. That is, the battery is not charged by default at its maximum rate, which can stress the battery cells. If no specific operational need is immediately expected, the battery could be charged very slowly. It could even be that due to operational conditions (i.e., very short flight, and depending on aircraft configuration), not all batteries are needed so charge could be only considered for some batteries.

In a particular embodiment, the at least one parameter of the battery is selected from:
state of charge;
state of health;
temperature;
state of power;
imbalance status of battery cells;
failure status;
voltage;
capacity;
calculated parameter based on multiple parameters of the above.

Preferably, the battery parameters that the battery control unit monitors are at least the state of charge, the state of power and failure status.

The state of charge (SOC) of a battery describes the ratio of the available charge to the maximum possible charge that can be stored in a battery at any moment. A fully charged battery has a SOC=1 or 100%.

The state of health (SOH) describes the ratio of the maximum battery capacity at a given time to its rated capacity at beginning of life. A new battery has a maximum SOH, and this value diminishes with ageing in line with the capacity decrease.

The temperature of the battery describes the temperature inside the battery.

The state of power (SOP) of a battery is the maximum power capability the battery can provide at a given moment, i.e., the power available from the battery at a given time.

An imbalanced battery is when the battery cells are not evenly charged inside the battery or have a different voltage.

Battery failure can occur in sensors or connectors as well as at the cell level e.g., when one or several cells fail as a result of a short circuit, open circuit, deep discharge, or thermal runaway, among others.

The battery capacity is the total amount of electricity generated due to electrochemical reactions in the battery and is expressed in ampere hours (Ah).

In a particular embodiment, the data related to the mission profile of the aircraft comprises at least one of the following:
current flight phase;
flight plan;
cruise time left;
a combination of any of the above.

Preferably, the data related to the mission profile of the aircraft that the controller receives comprises at least current flight phase, flight plan and cruise time left.

The flight phases of a management system known for an aircraft are pre-departure, taxi, take-off, climb, cruise, descent, approach and parking. Some of these flight phases take place on the ground and others in flight. The current flight phase is the flight phase in which the aircraft is located.

The flight plan is a document filed by a pilot or flight dispatcher with the local Air Navigation Service Provider prior to departure which indicates the aircraft's planned route or flight path.

The cruise time left is the remaining flight time to move to the descent phase and depends on the flight plan.

In an embodiment, the controller is further configured to receive data related to at least one aircraft parameter for the determination of whether to charge the at least one battery and according to which charge set point. The at least one aircraft parameter is preferably selected from: electrical emergency condition, aircraft system failure status, electric network status, external/internal electric power availability, load management system input, a combination of any of the above parameters. More preferably, the controller is configured to receive data related to at least one aircraft parameter combined with data related to the mission profile and to determine, based at least on the charge set points, the at least one parameter of the at least one battery, the at least one aircraft parameter and the data related to the mission profile of the aircraft, whether to charge the at least one battery and according to which charge set point. Preferably, the data related to the mission profile comprises at least current flight phase, flight plan and cruise time left and the at least one aircraft parameter comprises electric power availability.

The electrical emergency condition is the aircraft condition when the main electrical generation is lost (example: loss of engines, or full loss of generators).

The aircraft system failure status is an indicator of a failure in any of the systems of the aircraft related to energy management, such as failures of generators, engine, electrical distribution elements.

The electrical network status is an indicator of the state of the aircraft electric network, such as availability of electrical power, contactors status, reconfiguration applied if any.

The external electric power availability is an indicator of the amount of power that is available at any given time to supply to the aircraft from ground means.

The internal electric power availability is an indicator of the amount of power that is available at any given time to supply to the aircraft from aircraft generations.

The load management system input is the possibility to shed loads from the aircraft (example: non-essential loads linked to cabin equipment's) to manage network stability and compliance between power available and power needed by loads.

In a particular embodiment, the charge control system is configured to control the charge of a plurality of batteries, the system comprising a plurality of battery control units, wherein each battery control unit is configured to determine charge set points for a battery based on the at least one parameter of the battery.

Aircraft usually have a plurality of on-board batteries. In this sense, according to this embodiment, a charge set point is determined for each battery by means of the battery monitoring system. That is, the at least one parameter of all rechargeable batteries installed in the aircraft will be monitored in real time by the battery control units.

Data monitored by the battery control units and the charge set points determined also by the battery control units are provided to the controller. According to this data from the battery control units and at least the mission profile of the aircraft, the controller determines which batteries from the plurality of batteries to charge and according to which charge set point.

According to this embodiment, the charge control system has the ability to control not only the charging of one battery but of a plurality of batteries in the aircraft, take into account all of them, consider the available electric power in the aircraft and the mission profile and make the decision of which batteries should be charged and according to which charge set point.

There is no known method to manage the charge in order to optimize the battery's life.

In a second inventive aspect, the present invention provides an aircraft comprising:

at least one battery;

an electric power network; and a charge control system according to the first inventive aspect;

wherein:

the at least one battery control unit of the charge control system is connected to the at least one battery and to the electric power network;

the controller of the charge control system is connected to the electric power network; and the charge control system is configured to provide electric power to the at least one battery, according to the determination whether to charge the at least one battery, by the at least one battery control unit.

The aircraft is provided with at least one battery, an electric power network that forms part of the electrical system of the aircraft, and a charge control system as the one previously described above. The charge control system is configured to connect the at least one battery to the electric power network with the aim to control the charge of the battery.

Both the battery control unit and the controller are configured to be connected to the electric power network. The connection allows to supply electric power to the battery through the battery control unit in order to charge the battery according to the charge set point already selected by the controller. That is, the controller exercises control over the electrical system of the aircraft and in particular over the electric power network to provide the electric power supply order to the battery under specified charge set points.

The battery control unit is also connected to the battery to manage the electric power input to the battery from the electric power network of the aircraft. Specifically, the battery control unit manages the electric power input to the battery adapting the electric power coming from the electric power network of the aircraft.

In an example, the batteries installed in the aircraft can be composed of lithium chemistry, or can be provided with super capacitors or other storage technology.

In a third inventive aspect, the present invention provides a method for controlling the charge of at least one battery of an aircraft by means of a charge control system according to the first inventive aspect, the method comprising the following steps:

monitoring at least one parameter of the at least one battery by the at least one battery control unit of the charge control system;

determining by means of the at least one battery control unit a plurality of charge set points based on the at least one parameter of the at least one battery that is monitored in the previous step;

providing to the controller of the charge control system data related to a mission profile of the aircraft, the charge set points determined by the at least one battery control unit and the at least one parameter of the at least one battery;

determining by the controller whether to charge the at least one battery and according to which charge set point based at least on the data related to the mission profile of the aircraft, the charge set points and the at least one parameter of the at least one battery; and charging the at least one battery by the at least one battery control unit, if so determined by the controller, according to the charge set point.

The present method allows controlling the charge of at least one battery in an aircraft in a precise way according to at least the mission profile of the aircraft and the at least one parameter of the battery. The method controls the charge of a battery in the sense of determining whether to charge or not the battery and according to which charge set point.

According to the present method, first the battery is monitored by the battery control unit to obtain data about at least one parameter of the battery. The at least one parameter of the battery is representative of a functional and/or physical state of the battery. Based on the at least one parameter of the battery, the battery control unit determines a charge set point for each predefined charging mode. The at least one parameter of the battery and the charge set points, are provided to the controller. In addition, the controller also receives at least data related to the mission profile of the aircraft. Finally, the controller determines if the battery is to be charged and if so, decides the charge set point according to which the battery is going to be charged and then the battery is charged by the battery control unit according to the selected charge set point. Based on the determination of the controller, the controller informs the battery control unit about the charge set point selected and instructs the electric power network of the aircraft to supply electric power to the battery control unit for charging the battery.

In a particular embodiment, the method is also configured for controlling the charge of a plurality of batteries of the aircraft.

In a particular embodiment, step c) further comprises providing to the controller input data from the crew or crew member and/or from a computer configured to manage at least part of the aircraft operations.

In an embodiment, the method further comprises a step of providing the controller with data related to at least one aircraft parameter for the determination of whether to charge the at least one battery and according to which charge set point. Preferably, the at least one aircraft parameter is selected from: electrical emergency condition, aircraft system failure status, electric network status, external/internal electric power availability, load management system input, a combination of any of the above parameters.

In a particular embodiment, if in step a) the at least one battery control unit determines that a state of charge of the battery is below its minimum state of charge, and in step c) the controller receives an indication that a cruise time left is below a first predefined threshold, the controller determines in step d) that the battery must be charged according to a first charge set point.

In a particular embodiment, if in step a) the at least one battery control unit determined that a state of charge of the battery is below its minimum state of charge and the temperature of the battery is below a second predefined threshold, and in step c) the controller receives an indication that a cruise time left is above a first predefined threshold, the controller determines in step d) that the battery must be charged according to a second charge set point.

In a particular embodiment, if in step c) the controller receives an indication that the aircraft only has power available below a third predefined threshold to provide power to the at least one battery, the controller determines in step d) that the battery must be charged according to a third charge set point.

In a more particular embodiment, each charge set point corresponds to a battery charge rate, and the first charge set point corresponds to a battery charge rate faster than the battery charge rates associated to the second and third charge set points and the third charge set point corresponds to a battery charge rate slower than the battery charge rates associated to the first and second charge set points. According to a more particular embodiment, the first charge set point corresponds to a maximum charge rate, the second charge set point corresponds to an optimum charge rate, and the third charge set point corresponds to a slow charge rate, for the present charge control system. The maximum charge rate (also called fast charge rate) may be based on a charge set point that optimizes charging time, however, the fast charge rate takes a penalty on the battery life. The optimum charge rate may be based on a charge set point that compromises between charging time and battery degradation. The slow charge rate may be based on a charge set point that prioritized battery life over charging time.

BRIEF DESCRIPTION OF THE DRAWINGS

These and other features and advantages of the invention will be more clearly understood based on the following detailed description and attached drawings of the preferred embodiments, which are non-limiting examples of the invention and are provided by way of illustration only.

DETAILED DESCRIPTION OF THE PREFERRED EMBODIMENTS

The present invention discloses a charge control system for controlling the charge process of batteries installed in an aircraft (7). For the examples described below, three predefined charging modes are proposed as three battery charge rates that consist of a maximum or fast charge rate, an optimum charge rate, and a minimum or slow charge rate. In other embodiments a different number and/or types of charging modes may be defined.

Figure 1:
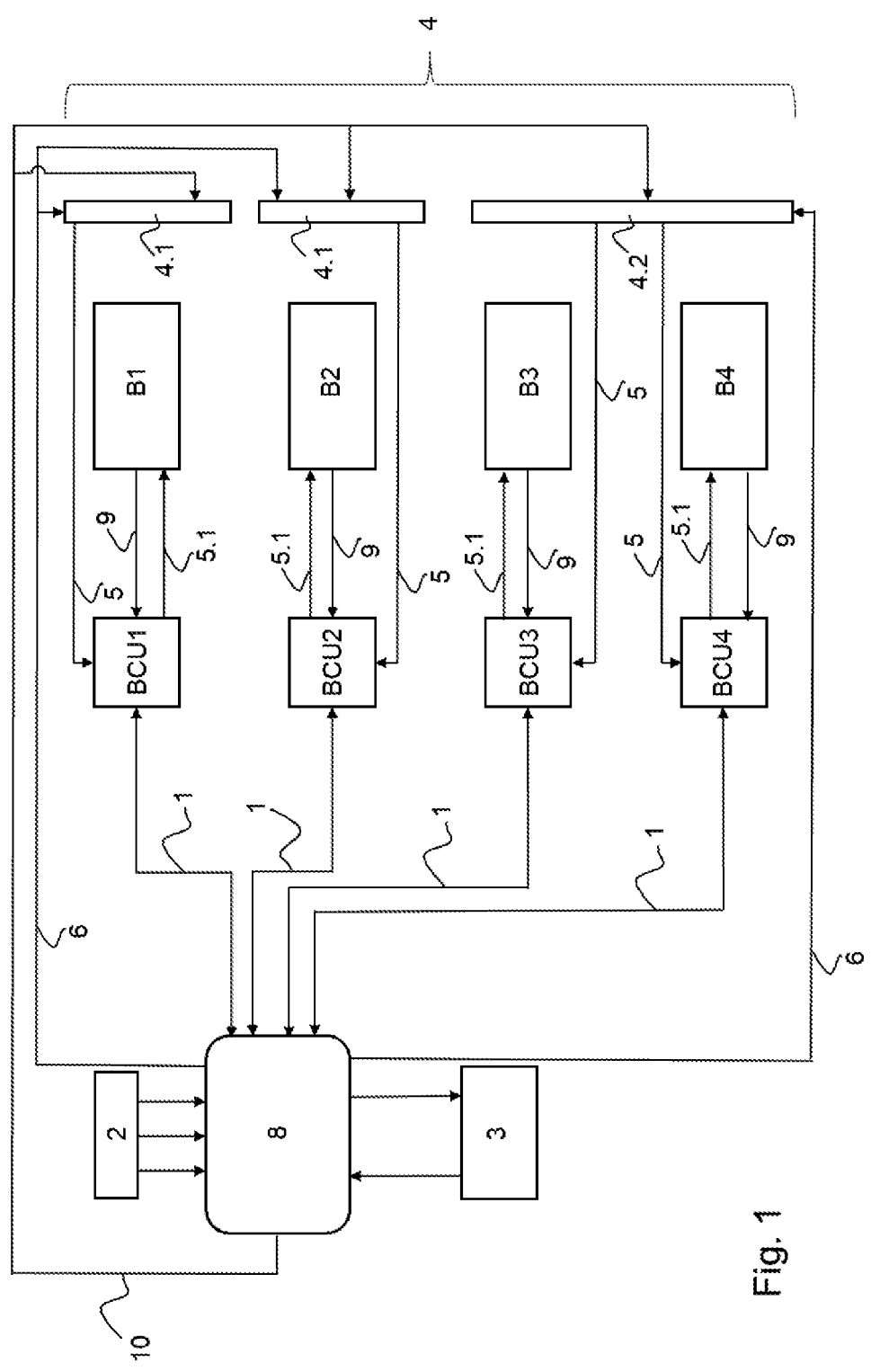
FIG. 1 schematically shows an architecture of the charge control system according to an embodiment of the present invention.

FIG. 1 shows an architecture of the charge control system, schematically representing the components, the connection between components and the information shared between them according to an embodiment of the present invention, when installed in an aircraft (7). FIG. 1 shows the charge control system and a plurality of batteries (B1, B2, B3, B4). In particular, the aircraft (7) may include a number of batteries, the charge of which can be controlled by the present charge control system. Among the batteries (B1, B2, B3, B4) located in the aircraft (7), there can be batteries intended for high voltage and batteries intended for low voltage. According to aeronautical applications, high voltage is about 60V to 1000V, and low voltage is below 60V.

In the architecture shown in FIG. 1, there is a first battery (B1) and a second battery (B2) both intended for high voltage, and a third battery (B3) and a fourth battery (B4) intended for low voltage. In this embodiment, the charge control system comprises a plurality of battery control units (BCU1, BCU2, BCU3, BCU4) each one intended for one battery (B1, B2, B3, B4). As shown, a first battery control unit (BCU1) is connected to the first battery (B1), a second battery control unit (BCU2) is connected to the second battery (B2), a third battery control unit (BCU3) is connected to the third battery (B3) and a fourth battery control unit (BCU4) is connected to the fourth battery (B4). Although four batteries and battery control units are depicted, any number of batteries and battery control units may be used.

Each battery control unit (BCU1, BCU2, BCU3, BCU4) monitors at least one parameter of the battery (B1, B2, B3, B4) to which the battery control unit (BCU1, BCU2, BCU3, BCU4) is connected. The data acquisition performed by the battery control units (BCU1, BCU2, BCU3, BCU4) on the batteries (B1, B2, B3, B4) is represented by arrows (9).

The charge control system further comprises a controller (8) also shown in FIG. 1, wherein the controller (8) is in data communication with each battery control unit (BCU1, BCU2, BCU3, BCU4). The controller (8) is configured to send and/or receive data to and/or from the battery control units (BCU1, BCU2, BCU3, BCU4). This data exchange between the controller (8) and the battery control units (BCU1, BCU2, BCU3, BCU4) is identified in FIG. 1 by arrows (1).

In addition, the controller (8) is also configured to receive data about the mission profile (2) of the aircraft (7), data related to aircraft parameters and input data (3) from a crew or crew member and/or from a computer configured to manage at least part of the aircraft operations.

The architecture of FIG. 1 further shows an electric connection between the controller (8) and the electric power network (4) of the aircraft (7), and particularly between the controller (8) and the bus bars (4.1, 4.2). Specifically, the electric power network (4) comprises high voltage bus bars (4.1) and a low voltage bus bar (4.2). The electric connection between the controller (8) and the electric power network (4) is shown by arrows (6), this electric connection denotes the controller (8) acting on the electric power network (4) to supply electric power to the battery control units (BCU1, BCU2, BCU3, BCU4) to charge the batteries (B1, B2, B3, B4) as needed. On the other hand, there is a data connection between the controller (8) and the bus bars (4.1, 4.2) of the electric power network (4) which represents the data communication from the controller (8) to the bus bars (4.1, 4.2) of the electric power network (4) informing it of the need to charge which battery, and this data connection is shown by arrows (10). Specifically, the data represented by the arrow (10) comprises an order to open/close a contactor in the electric power network (4) to provide electric power to the corresponding battery control unit (BCU1, BCU2, BCU3, BCU4).

Moreover, there is an electric connection between the electric power network (4), and the battery control units (BCU1, BCU2, BCU3, BCU4) also denoted by arrows (5) that are understood as the charge current supplied from the electric power network (4) of the aircraft (7) to each battery control unit (BCU1, BCU2, BCU3, BCU4). It is through the charge control units (BCU1, BCU2, BCU3, BCU4) that the charge current (electric power) is supplied to the batteries in a controlled manner, and this is represented by the arrow (5.1). Moreover, the first battery (B1) and second battery (B2) are power supplied from the high voltage bus bars (4.1) of the electric power network (4), and the third battery (B3) and fourth battery (B4) are power supplied from the low voltage bus bar (4.2) of the electric power network.

Based on the architecture shown in FIG. 1, each battery control unit (BCU1, BCU2, BCU3, BCU4) is configured to determine a charge set point for each battery charge rate according to the at least one parameter of the corresponding battery (B1, B2, B3, B4) that is monitored by the battery control unit (BCU1, BCU2, BCU3, BCU4).

The controller (8) hosts at least one predetermined algorithm that allows determining the way in which certain batteries (B1, B2, B3, B4) should be charged based on all the data available to the controller (8). The predetermined algorithm takes into account charge set points and the at least one parameter of the batteries (B1, B2, B3, B4) received from the battery control units (BCU1, BCU2, BCU3, BCU4), the data related to the mission profile (2) of the aircraft (7) and data related to aircraft parameters, and determines which battery (B1, B2, B3, B4) to charge and according to which charge set point corresponding to a charging mode, i.e., slow, optimum or fast charge rate. Each charge set point comprises data relative to a current target a battery may receive to be charged. The controller (8) may also receive input data (3) from crew or crew member and/or a computer to determine which batteries (B1, B2, B3, B4) need to be charged and according to which charge rate. The crew and/or the computer may be on ground or on board.

The at least one parameter of the batteries (B1, B2, B3, B4) is an indication of the physical and/or functional status of the same. Specifically, the battery control unit (BCU1, BCU2, BCU3, BCU4) may determine one or several parameters of a battery (B1, B2, B3, B4), such as state of charge, state of health, temperature, state of power, imbalance, failure status, voltage, capacity, calculated parameter based on multiple parameters of the above.

The mission profile (2) of an aircraft (7) includes aircraft parameters such as current flight phase, flight plan, cruise time left, etc. The aircraft parameters may be electrical emergency condition, aircraft systems failure status, electric network status, external/internal electric power availability, engine off-take power availability and status, load management system input, etc.

The method for controlling the charge of a plurality of batteries (B1, B2, B3, B4) of an aircraft (7) by means of the charge control system described above for FIG. 1 comprises the following steps:

a) monitoring at least one parameter of each battery (B1, B2, B3, B4) by the corresponding battery control unit (BCU1, BCU2, BCU3, BCU4) of the charge control system;

b) determining by each battery control unit (BCU1, BCU2, BCU3, BCU4) a plurality of charge set points based on the at least one parameter of each battery 8B1, B2, B3, B4);

c) providing to the controller (8) of the charge control system data related to a mission profile of the aircraft (7), the charge set points determined by the battery control units (BCU1, BCU2, BCU3, BCU4) and the at least one parameter of each battery (B1, B2, B3, B4);

d) determining by the controller (8) which batteries (B1, B2, B3, B4) and according to which charge set point according to at least the data related to the mission profile of the aircraft, data related to aircraft parameters, the charge set points and the at least one parameter for each battery; and e) charging each battery (B1, B2, B3, B4) by its respective battery control unit (BCU1, BCU2, BCU3, BCU4), if so determined by the controller (8), according to a charge set point.

In a particular example, the method further comprises in the step c) providing to the controller (8) input data from crew or crew member and/or from a computer configured to manage at least part of the aircraft operations, the crew and/or computer may be located in the aircraft and/or on ground.

In addition, once the controller (8) has determined which batteries (B1, B2, B3, B4) need to be charge and according to which charge set point, the controller (8) sends a signal to the electric power network (4) of the aircraft (7) to supply electric power to the corresponding battery control units (BCU1, BCU2, BCU3, BCU4). In this way the electric power network (4) supplies electric power to the battery control units (BCU1, BCU2, BCU3, BCU4) for charging the needed batteries (B1, B2, B3, B4). The battery control units (BCU1, BCU2, BCU3, BCU4) control the power input to the batteries (B1, B2, B3, B4) according to the charge set point chosen by the controller (8) and indicated by the data represented by the arrows (1).

The following will describe different examples of operation in which the charge control system described above, regarding FIG. 1, actuates to control the charge of the batteries (B1, B2, B3, B4) installed in the aircraft (7). Each of the examples shown in FIGS. 2 to 4 respectively corresponds to the actuation of the charge control system according to a particular flight phase in which the aircraft (7) is located and other events that need to be considered for controlling the charge of the batteries (B1, B2, B3, B4). That is, particular examples of how the predetermined algorithm works can be seen as follows.

Figure 2:
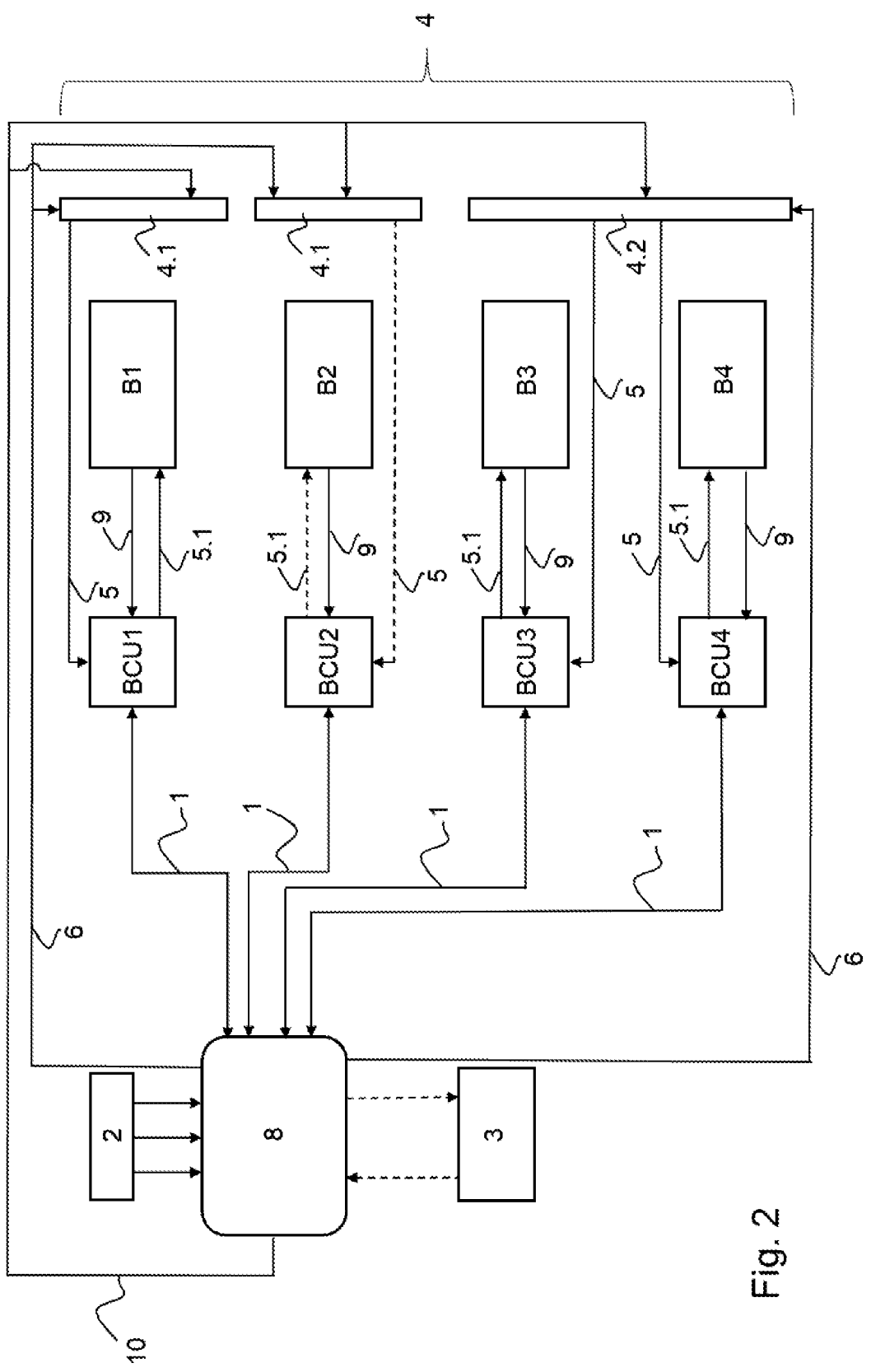
FIG. 2 schematically shows a first example of the charge control system in operative mode according to the present invention.

FIG. 2 shows a first example according to the ground phase where the aircraft (7) is located. That is, the mission profile (2) of the aircraft (7) comprises data related to the ground phase and a ground cart availability.

Regarding a first battery (B1), the first battery control unit (BCU1) determines significant cell imbalance. Based on this parameter (imbalance) of the first battery (B1), the first battery control unit (BCU1) determines a charge set point for each charge rate (fast, optimum and slow rates). The charge set points determined by the first battery control unit (BCU1) and the parameter from the first battery (B1) are provided to the controller (8), as schematically represented by the arrow (1) between the first battery control unit (BCU1) and the controller (8). In this case, the charge set points corresponding to an optimum charge rate and a slow charge rate could be at a higher value than a standard value considering all other parameters (temperature, SOC, . . . ) to specifically allow recovery of imbalance in the first battery (B1). The standard value is the charge value for a balanced battery at an average ambient temperature of 25° C. The charge set point corresponding to a fast charge rate in this case could be lower than a standard value to protect the cells.

Regarding a second battery (B2), the second battery control unit (BCU2) determines a normal status of the second battery (B2) and that it is fully charged. Based on this parameter (state of charge) of the second battery (B2), the second battery control unit (BCU2) determines a charge set point for each charge rate. The charge set points determined by the second battery control unit (BCU2) and the parameter from the second battery (B2) are provided to the controller (8), as schematically represented by the arrow (1) between the second battery control unit (BCU2) and the controller (8). In this example, all the charge set points are 0 for the second battery (B2), as the second battery (B2) is fully charged and thus no charge is needed by the second battery (B2).

Regarding a third battery (B3), the third battery control unit (BCU3) determines that a group of cells/modules within the third battery (B3) is electrically disconnected from the main due to some known or unexpected failure condition. Based on this parameter (cell failure status) of the third battery (B3), the third battery control unit (BCU3) determines a charge set point for each charge rate. The charge set points determined by the third battery control unit (BCU3) and the parameter from the third battery (B3) are provided to the controller (8), as schematically represented by the arrow (1) between the third battery control unit (BCU3) and the controller (8). In this example, all the charge set points are lower than standard values as there are less cells to charge.

Regarding a fourth battery (B4), the fourth battery control unit (BCU4) determines that the temperature of the battery is −15° C. Based on this parameter (temperature) of the fourth battery (B4), the fourth battery control unit (BCU4) determines a charge set point for each charge rate. The charge set points determined by the fourth battery control unit (BCU4) and the status from the fourth battery (B4) are provided to the controller (8), as schematically represented by the arrow (1) between the fourth battery control unit (BCU4) and the controller (8). In this example, the charge set points corresponding to an optimum charge rate and to a slow charge rate are the same and equal to the lowest of them as when cells of the battery are cold, they cannot be charged quickly and therefore a permanent damage to cells of the fourth battery (B4) is prevented.

Once the controller (8) is provided with the data related to the mission, in that case that it is a ground phase with ground cart availability for electric power, and also with the charge set points and the parameters of the batteries (B1, B2, B3, B4), then the controller (8) determines that the second battery (B2) does not need to be charged and this is shown in FIG. 2 with intermittent line for the arrow (5) between the high voltage bus bar (4.1) and the second battery control unit (BCU2) and with the intermittent line for the arrow (5.1)

between the second battery control unit (BCU2) and the second battery (B2). Moreover, the controller (8) determines that an optimum set point is selected for the rest of the batteries (B1, B3, B4). This means that the first battery (B1), third battery (B3) and fourth battery (B4) should be charged at a second or optimum charge rate.

In addition, according to the selected charge set point, the controller (8) actuates on the electric power network (4) of the aircraft (7) to supply electric power, through the bus bars (4.1, 4.2), in order to charge the batteries (B1, B3, B4) with an optimum charge rate that is managed by the corresponding battery control unit (BCU1, BCU3, BCU4) as shown by the arrows (5.1) between the battery control units (BCU1, BCU3, BCU4) and the batteries (B1, B3, B4).

According to this first example, there is no input data (3) from a crew or crew member and/or computer and this is indicated by an intermittent line between the input data (3) and the controller (8).

Figure 3:
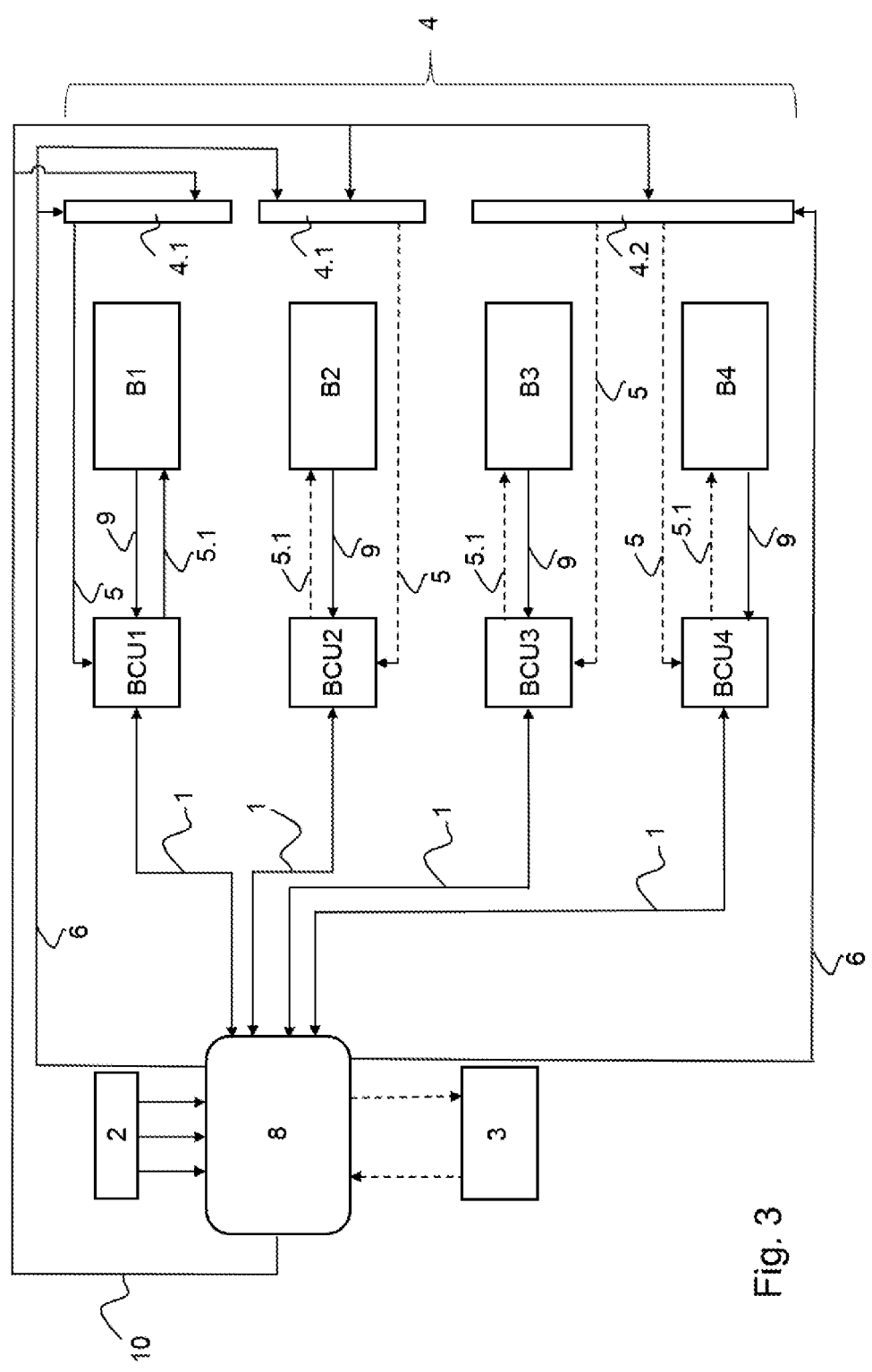
FIG. 3 schematically shows a second example of the charge control system in operative mode according to the present invention.

FIG. 3 shows a second example according to a flight phase before approach where the aircraft (7) is located and low engine off-take power availability. That is, the mission profile (2) of the aircraft (7) comprises data related to the flight phase before approach and low engine off-take power availability.

Regarding a first battery (B1), which is a high voltage battery, the first battery control unit (BCU1) determines significant cell imbalance. Based on this parameter (imbalance) of the first battery (B1), the first battery control unit (BCU1) determines a charge set point for each charge rate as in the previous example. The charge set points determined by the first battery control unit (BCU1) and the parameter of the first battery (B1) are provided to the controller (8) as shown by the arrow (1) between the first battery control unit (BCU1) and the controller (8).

Regarding a second battery (B2), the second battery control unit (BCU2) determines the normal status of the second battery (B2) and that it is fully charged. Based on this parameter (state of charge) of the second battery (B2), the second battery control unit (BCU2) determines a charge set point for each charge rate. The charge set points determined by the second battery control unit (BCU2) and the parameter from the second battery (B2) are provided to the controller (8) as shown by the arrow (1) between the second battery control unit (BCU2) and the controller (8).

Regarding a third battery (B3), the third battery control unit (BCU3) determines that a group of cells/module within the third battery (B3) is electrically disconnected from the main due to some known or unexpected failure condition and that the state of charge is 70%. Based on these parameters (cell failure status and the state of charge) of the third battery (B3), the third battery control unit (BCU3) determines a charge set point for each charge rate. The charge set points determined by the third battery control unit (BCU3) and the parameters from the third battery (B3) are provided to the controller (8) as shown by the arrow (1) between the third battery control unit (BCU3) and the controller (8).

Regarding a fourth battery (B4), the fourth battery control unit (BCU4) determines that the temperature of the battery is −15° C. and that the state of charge is 50%. Based on these parameters (temperature and state of charge) of the fourth battery (B4), the fourth battery control unit (BCU4) determines a charge set point for each charge rate. The charge set points determined by the fourth battery control unit (BCU4) and the parameters from the fourth battery (B4) are provided to the controller (8) as shown by the arrow (1) between the fourth battery control unit (BCU4) and the controller (8).

Once the controller (8) is provided with the data related to the flight phase before approach and the low engine off-take power availability, and also with the charge set points and the parameters of the batteries (B1, B2, B3, B4), then the controller (8) determines that the second battery (B2), third battery (B3) and fourth battery (B4) do not need to be charged and this is shown in FIG. 3 with intermittent line for the arrow (5) between the bus bars (4.1, 4.2) and the second (BCU2), third (BCU3) and fourth (BCU4) battery control unit and with intermittent line for corresponding arrows (5.1). In this example, the controller (8) based on the sufficient state of charge of batteries (B2, B3, B4) and on the available power in the aircraft, decides to prioritize the charging of the first battery (B1) because high voltage battery could be needed in the rest of the mission with full power. Therefore, the controller (8) determines that a fast charge set point is selected for the first battery (B1). This means that the first battery (B1) should be charged at a fast charge rate.

In addition, according to the selected charge set point, the controller (8) actuates on the electric power network (4) of the aircraft (7) to supply electric power, through the high voltage bus bar (4.1), in order to charge the first battery (B1) according to a first or fast charge rate that is managed by the corresponding battery control unit (BCU1) as shown by the arrow (5.1) between the first battery control unit (BCU1) and the first battery (B1).

According to this second example, there is no input data (3) from a crew or crew member and/or a computer and this is indicated by an intermittent line between the input data (3) and the controller (8).

Figure 4:
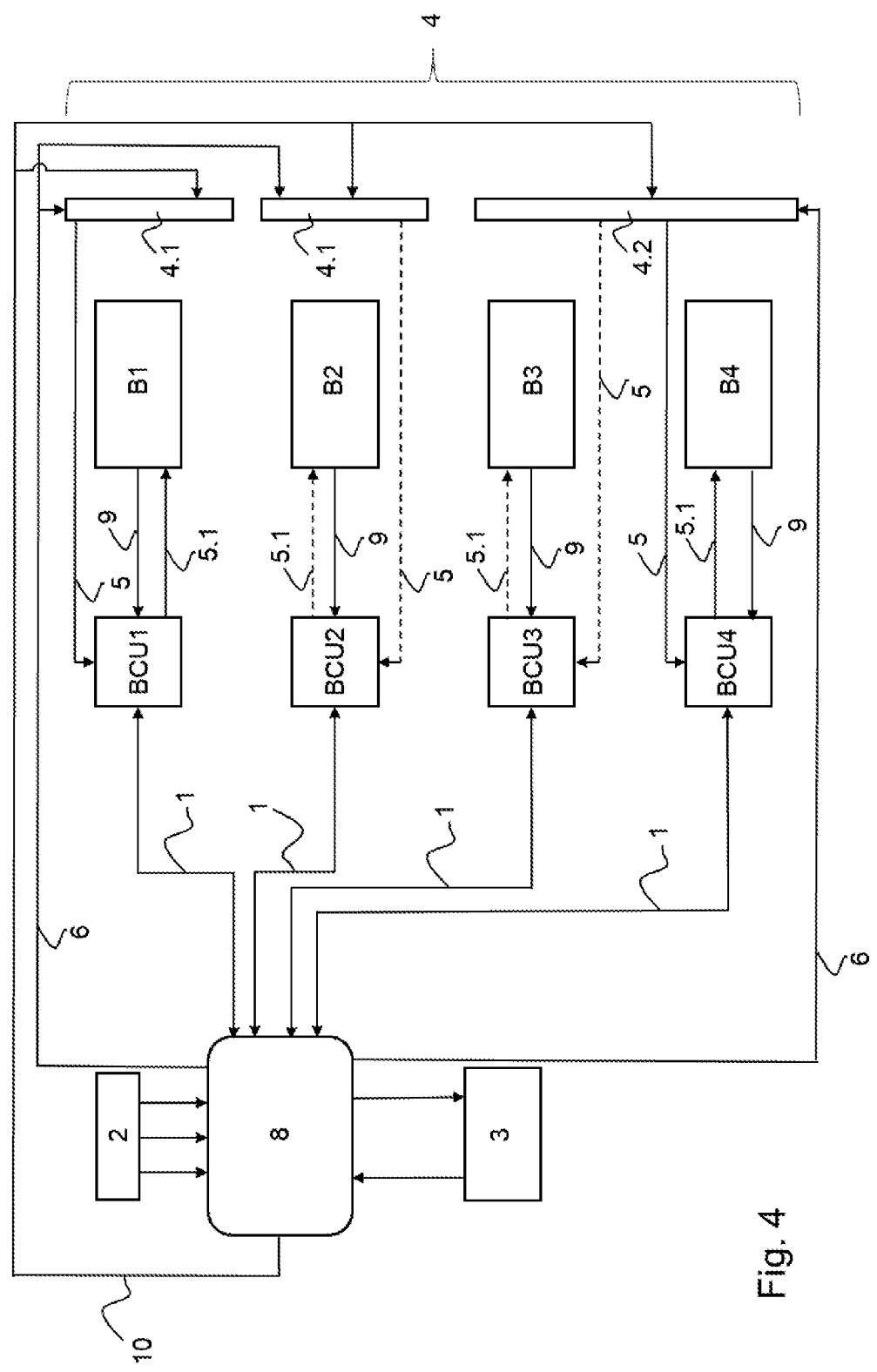
FIG. 4 schematically shows a third example of the charge control system in operative mode according to the present invention.

FIG. 4 shows a third example according to a flight phase before approach where the aircraft (7) is located and medium engine off-take power availability. That is, the mission profile (2) of the aircraft (7) comprises data from the flight phase before approach and the aircraft parameters comprises data of medium engine off-take power availability.

Regarding a first battery (B1), which is a high voltage battery, the first battery control unit (BCU1) determines significant cell imbalance. Based on this parameter (imbalance) of the first battery, the first battery control unit (BCU1) determines a charge set point for each charge rate as in previous examples. The charge set points determined by the first battery control unit (BCU1) and the parameter from the first battery (B1) are provided to the controller (8) as shown by the arrow (1) between the first battery control unit (BCU1) and the controller (8).

Regarding a second battery (B2), which is also a high voltage battery, the second battery control unit (BCU2) determines a normal status of the second battery (B2) and that it is fully charged. Based on this parameter (state of charge) of the second battery (B2), the second battery control unit (BCU2) determines a charge set point for each charge rate. The charge set points determined by the second battery control unit (BCU2) and the parameter from the second battery (B2) are provided to the controller (8) as shown by the arrow (1) between the second battery control unit (BCU2) and the controller (8).

Regarding a third battery (B3), which is a low voltage battery, the third battery control unit (BCU3) determines that a group of cells/module within the third battery (B3) is electrically disconnected from the main due to some known or unexpected failure condition and that the state of charge is 70%. Based on these parameters (cell failure status and the state of charge) of the third battery (B3), the third battery control unit (BCU3) determines a charge set point for each charge rate. The charge set points determined by the third battery control unit (BCU3) and the parameters from the third battery (B3) are provided to the controller (8) as shown by the arrow (1) between the third battery control unit (BCU3) and the controller (8).

Regarding a fourth battery (B4), also a low voltage battery, the fourth battery control unit (BCU4) determines that the temperature of the battery is −15° C. and that the state of charge is 50%. Based on these parameters (temperature and state of charge) of the fourth battery (B4), the fourth battery control unit (BCU4) determines a charge set point for each charge rate. The charge set points determined by the fourth battery control unit (BCU4) and the parameters from the fourth battery (B4) are provided to the controller (8) as shown by the arrow (1) between the fourth battery control unit (BCU4) and the controller (8).

Once the controller (8) is provided with the data related to the flight phase before approach and the medium engine off-take power availability, the crew order with input data (3) which requests specifically to charge the low voltage battery (for example because there is a prevision of a short turn around after current mission and quick dispatch condition is targeted) and also with the charge set points and the status of the batteries (B1, B2, B3, B4), then the controller (8) determines that the second battery (B2) and third battery (B3) do not need to be charged and this is shown in FIG. 4 with intermittent line for the arrow (5) between the respective bus bars (4.1, 4.2) and the second (BCU2) and third (BCU3) battery control unit and with intermittent line for the arrows (5.1) between the second (BCU2) and third (BCU3) battery control unit and the second battery (B2) and third battery (B3) respectively.

Moreover, the controller (8) determines that a fast set point is selected for the first battery (B1), and a second or (optimum) set point is selected for the fourth battery (B4). This means that the first battery (B1) should be charged at a fast charge rate and that the fourth battery (B4) should be charged at an optimum charge rate.

In addition, according to the selected charge set points, the controller (8) actuates on the electric power network (4) of the aircraft (7) to supply electric power, through the corresponding bus bar (4.1, 4.2), in order to charge the first battery (B1) with a fast charge rate that is managed by the corresponding battery control unit (BCU1) and the fourth battery (B4) with an optimum charge rate that is managed by the corresponding battery control unit (BCU4).

An example where battery charging is needed at high rate is when the state of charge of the battery (B1, B2, B3, B4) is below its minimum state of charge and the cruise time left is below a first predefined threshold, so for ensuring the mission profile of the aircraft (7), the controller (8) launches a fast charge cycle with a fast charge rate. Through this actuation of the charge control system, the availability of the battery advantageously is maximized during the critical phase of the approaching. In addition, this configuration ensures that the battery (B1, B2, B3, B4) would not consume energy in approach phase which is typically detrimental on some aircraft (7) configuration with engines having a low margin at idle power to supply electrical power.

An example where battery charging is needed at optimum charge rate is when the state of charge of the battery (B1, B2, B3, B4) is below its minimum state of charge and its temperature is below a second predefined threshold (typically below zero degrees), and the cruise time left is above the first predefined threshold. Therefore, to ensure the mission profile of the aircraft (7), the controller (8) launches an optimum charge cycle with an optimum charge rate.

Through this actuation of the charge control system, the battery cells are less stressed and the lifetime of the battery (B1, B2, B3, B4) is optimized.

An example where the battery charging is needed at slow charge rate is when the aircraft (7) has a very low availability for power to provide for the battery (B1, B2, B3, B4), so that to ensure the mission profile of the aircraft (7), the controller (8) launches a slow charge cycle for the battery (B1, B2, B3, B4) with a slow charge rate. In another example, when the battery (B1, B2, B3, B4) is suspected to be damaged or when the temperature is below a second predefined threshold, the controller (8) also launches a slow charge cycle for the battery (B1, B2, B3, B4) with a slow charge rate.

In another example (not shown), in case of error in the reception of data from battery control unit (BCU1, BCU2, BCU3, BCU4) to the controller (8), the controller (8) determines an optimum or second charge rate only as a default mode with a fixed default range of current acceptable, in line with the safety objective in order to never overcharge the battery. Non-receipt of data to the controller (8) by the battery control unit (BCU1, BCU2, BCU3, BCU4) shall be understood as a "no signal" or as being zero charging mode.

Figure 5:
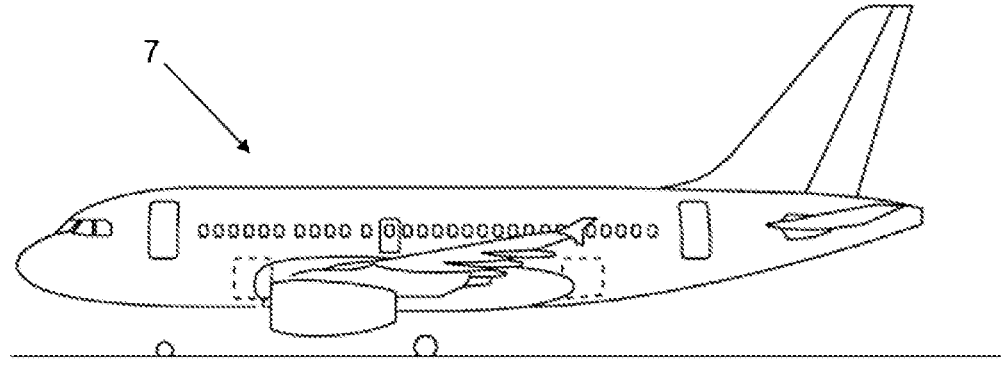
FIG. 5 schematically shows an aircraft according to an embodiment of the present invention.

FIG. 5 shows an aircraft (7) that includes a charge control system as described above in different examples, a plurality of batteries and an electric power network. The battery control unit of the charge control system is connected to the batteries and to the electric power network of the aircraft (7). The controller (8) of the charge control system is also connected to the electric power network. Further, the charge control system is configured to supply electric power the batteries according to the determination whether to charge each battery its corresponding battery control unit.

The systems and devices described herein may include a controller, such as controller (8) or battery control unit (BCU1 . . . BCU4), or a computing device comprising a processing unit and a memory which has stored therein computer-executable instructions for implementing the processes described herein. The processing unit may comprise any suitable devices configured to cause a series of steps to be performed so as to implement the method such that instructions, when executed by the computing device or other programmable apparatus, may cause the functions/acts/steps specified in the methods described herein to be executed. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may be any suitable known or other machine-readable storage medium. The memory may comprise non-transitory computer readable storage medium such as, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to the device such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. The memory may comprise any storage means (e.g., devices) suitable for retrievably storing the computer-executable instructions executable by processing unit.

The methods and systems described herein may be implemented in a high-level procedural or object-oriented programming or scripting language, or a combination thereof, to communicate with or assist in the operation of the controller or computing device. Alternatively, the methods and systems described herein may be implemented in assembly or machine language. The language may be a compiled or interpreted language. Program code for implementing the methods and systems for detecting skew in a wing slat of an aircraft described herein may be stored on the storage media or the device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein.

Computer-executable instructions may be in many forms, including program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A charge control system for controlling the charge of at least one battery of an aircraft, the system comprising:
   at least one battery control unit configured to monitor at least one parameter of the at least one battery;
   a controller in data communication with the at least one battery control unit and configured to receive at least data related to a mission profile of the aircraft;
   wherein the at least one battery control unit and the controller are configured to be connected to an electric power network of the aircraft;
   wherein the at least one battery control unit is further configured to determine a plurality of charge set points based on the at least one parameter of the at least one battery, each charge set point comprising data relative to at least a current target the at least one battery may receive to be charged;
   wherein the controller is configured to receive the charge set points and the at least one parameter of the at least one battery from the at least one battery control unit, and to determine, based at least on the charge set points, the at least one parameter of the at least one battery and the data related to the mission profile of the aircraft, whether to charge the at least one battery and according to which charge set point;

wherein the at least one battery control unit is further configured to supply the at least one battery with electric power, that comes from electric power network of the aircraft, according to the charge set point selected by the controller;

wherein each charge set point corresponds to a battery charge rate, and wherein the first charge set point corresponds to a battery charge rate faster than the battery charge rates corresponding to the second charge set point and the third charge set point and the third charge set point corresponds to a battery charge rate slower than the battery charge rates corresponding to the first charge set point and the second charge set point.

2. The charge control system according to claim 1, wherein the controller is configured to determine whether to charge the at least one battery and according to which charge set point in accordance with a predetermined algorithm which takes into account the data related to the mission profile of the aircraft, the charge set points and the at least one parameter of the at least one battery.

3. The charge control system according to claim 1, wherein the controller is also configured to receive input data from at least one of a crew, a crew member, or from a computer configured to manage at least part of aircraft operations.

4. The charge control system according to claim 1, wherein the at least one parameter of the at least one battery is selected from:

state of charge;

state of health;

temperature;

state of power;

imbalance status of battery cells;

failure status;

voltage;

capacity; or a calculated parameter based on multiple parameters of the above parameters.

5. The charge control system according to claim 1, wherein the data related to the mission profile of the aircraft comprises at least one of the following:

current flight phase;

flight plan;

cruise time left;

a combination of any of the above.

6. The charge control system according to claim 1, wherein the controller is further configured to receive data related to at least one aircraft parameter for a determination of whether to charge the at least one battery and according to which charge set point; and wherein the at least one aircraft parameter is preferably selected from: electrical emergency condition, aircraft system failure status, electric network status, external/internal electric power availability, load management system input, a combination of any of the above parameters.

7. The charge control system according to claim 1, wherein the charge control system is configured to control the charge of a plurality of batteries, the system comprises a plurality of battery control units, wherein each battery control unit is configured to determine charge set points for a battery based on the at least one parameter of said battery.

8. An aircraft comprising:

at least one battery;

an electric power network; and a charge control system according to claim 1;

wherein the at least one battery control unit of the charge control system is connected to the at least one battery and to the electric power network;

wherein the controller of the charge control system is connected to the electric power network; and wherein the charge control system is configured to provide electric power to the at least one battery, according to a determination whether to charge the at least one battery, by the at least one battery control unit.

9. A method for controlling the charge of at least one battery of an aircraft via a charge control system according to claim 1, the method comprising the following steps: monitoring at least one parameter of the at least one battery by the at least one battery control unit of the charge control system; determining by means of the at least one battery control unit a plurality of charge set points based on the at least one parameter of the at least one battery; providing to the controller of charge control system data related to a mission profile of the aircraft, the charge set points determined by the at least one battery control unit and the at least one parameter of the at least one battery; determining by the controller whether to charge the at least one battery and according to which charge set point based at least on the data related to the mission profile of the aircraft, the charge set points and the at least one parameter of the at least one battery; and charging the at least one battery by the at least one battery control unit, when so determined by the controller, according to a charge set point.

10. The method according to claim 9, further comprising:

providing to the controller input data from at least one of a crew, a crew member, or a computer configured to manage at least part of aircraft operations.

11. The method according to claim 9, wherein if when the at least one battery control unit determines that a state of charge of the battery is below a minimum state of charge, and the controller receives an indication that a cruise time left is below a first predefined threshold, the controller determines that the battery must be charged according to a first charge set point.

12. The method according to claim 11, wherein each charge set point corresponds to a battery charge rate, and wherein the first charge set point corresponds to a battery charge rate faster than the battery charge rates associated to the second and third charge set points and the third charge set point corresponds to a battery charge rate slower than the battery charge rates associated to the first and second charge set points.

13. The method according to claim 9, wherein when the at least one battery control unit determines that a state of charge of the battery is below a minimum state of charge and a temperature of the battery is below a second predefined threshold, and the controller receives an indication that a cruise time left is above a first predefined threshold, the controller determines that the battery must be charged according to a second charge set point.

14. The method according to claim 9, wherein when the controller receives an indication that the aircraft only has a power available below a third predefined threshold to provide power to the at least one battery, the controller determines that the battery must be charged according to a third charge set point.

15. The charge control system according to claim 1, wherein the first charge set point corresponds to a maximum charge rate, the second charge set point corresponds to an optimum charge rate, and the third charge set point corresponds to a slow charge rate, for the present charge control system.

16. A method for controlling the charge of at least one battery of an aircraft via a charge control system, the method comprising the following steps:

monitoring at least one parameter of the at least one battery by the at least one battery control unit of the charge control system;

determining by means of the at least one battery control unit a plurality of charge set points based on the at least one parameter of the at least one battery;

providing to the controller of charge control system data related to a mission profile of the aircraft, the charge set points determined by the at least one battery control unit and the at least one parameter of the at least one battery;

determining by the controller whether to charge the at least one battery and according to which charge set point based at least on the data related to the mission profile of the aircraft, the charge set points and the at least one parameter of the at least one battery; and, charging the at least one battery by the at least one battery control unit, when so determined by the controller, according to a charge set point, wherein when the at least one battery control unit determines that a state of charge of the battery is below a minimum state of charge, and the controller receives an indication that a cruise time left is below a first predefined threshold, the controller determines that the battery must be charged according to a first charge set point.

17. A method for controlling the charge of at least one battery of an aircraft via a charge control system, the method comprising the following steps:

monitoring at least one parameter of the at least one battery by the at least one battery control unit of the charge control system;

determining by means of the at least one battery control unit a plurality of charge set points based on the at least one parameter of the at least one battery;

providing to the controller of charge control system data related to a mission profile of the aircraft, the charge set points determined by the at least one battery control unit and the at least one parameter of the at least one battery;

determining by the controller whether to charge the at least one battery and according to which charge set point based at least on the data related to the mission profile of the aircraft, the charge set points and the at least one parameter of the at least one battery; and, charging the at least one battery by the at least one battery control unit, when so determined by the controller, according to a charge set point, wherein when the controller receives an indication that the aircraft only has a power available below a third predefined threshold to provide power to the at least one battery, the controller determines that the battery must be charged according to a third charge set point.

* * * * *